(12) United States Patent
Camacho

(10) Patent No.: US 8,587,163 B2
(45) Date of Patent: Nov. 19, 2013

(54) ELECTRIC MOTORS AND RELATED SYSTEMS FOR DEPLOYMENT IN A DOWNHOLE WELL ENVIRONMENT

(75) Inventor: Alejandro Camacho, Missouri City, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 865 days.

(21) Appl. No.: 12/572,548

(22) Filed: Oct. 2, 2009

(65) Prior Publication Data

US 2011/0080060 A1     Apr. 7, 2011

(51) Int. Cl.
*H02K 35/02*     (2006.01)
*H02K 41/03*     (2006.01)

(52) U.S. Cl.
USPC .... 310/15; 310/12.17; 310/12.18; 310/12.19; 310/12.33; 417/417

(58) Field of Classification Search
USPC ............... 310/15, 12.17, 12.18, 12.19, 12.33; 417/416, 417
See application file for complete search history.

(56) References Cited

U.S. PATENT DOCUMENTS 5,831,353 A * 11/1998 Bolding et al. ............ 310/12.15

* cited by examiner

*Primary Examiner* — Tran Nguyen
*Assistant Examiner* — David Scheuermann
(74) *Attorney, Agent, or Firm* — Jim Patterson

(57) ABSTRACT

Electric motors configured for deployment in a downhole well environment are provided. Downhole well pumping systems including an electric motor are also provided. In one example, an electric motor includes a series of at least three magnets, one of the inner and outer two magnets being movable. A supply of alternating current is configured to alternate the polarity of one of the inner and outer two magnets to thereby cause one of the inner and outer two magnets that is movable to reciprocate and provide linear output to drive an operable production device. In another example, two adjacent, stationary magnets and at least one movable magnet are adjacent to one another. A supply of alternating current is coupled to the magnets so as to alternate the polarity of one of the movable and stationary magnets and to thereby to cause reciprocating linear output to drive the operable production device.

11 Claims, 8 Drawing Sheets

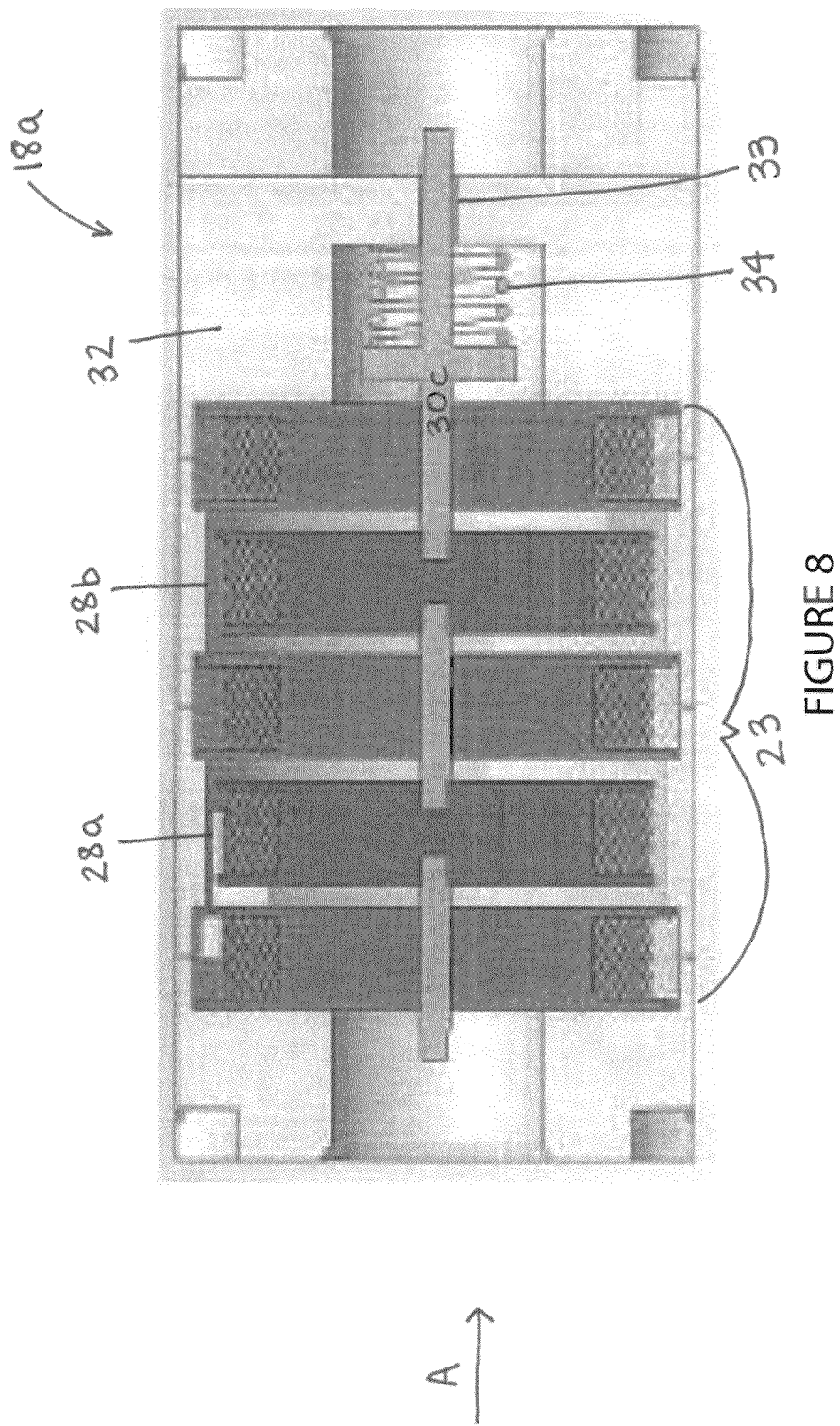

US 8,587,163 B2

ELECTRIC MOTORS AND RELATED SYSTEMS FOR DEPLOYMENT IN A DOWNHOLE WELL ENVIRONMENT

FIELD

The present application relates to the oil field industry and more specifically to motors that supply output to an operable production device in a well, such as for example a pump, sleeve, valve or other mechanical device. The disclosures provided herein can be particularly useful in small-bore applications.

BACKGROUND

Artificial lift in wells can be achieved by the use of downhole electric motors that convert rotational motion to linear motion, or by the use of surface-bound rod pumps. Electric motors typically employ magnetic forces to create rotational motion, which is then converted to linear motion in order to provide output to an operable production device, such as a pump or other mechanical device. The conversion of rotational motion to linear motion involves failure-prone mechanisms and complex moving parts, which disadvantageously introduce efficiency and/or reliability losses to the system. This rotational-to-linear conversion is also impractical in special small-bore applications, where space constraints limit the size of the motor and therefore its output capabilities. Current non-rotational artificial lift methods, such as rod pumps, disadvantageously require surface motors and extensive shafting to couple a source of power to a downhole linear pump. These methods are not a viable option in areas where above-ground space is at a premium.

SUMMARY

The present disclosure provides improved electric motor configurations for deployment in a downhole well environment. The unique configurations employ linear reciprocating movement of a series of aligned magnets including one or more movable magnets in combination with one or more stationary magnets. This advantageously provides raw linear output, while taking up relatively little annular space in the well. This technology is thus especially suitable for use in small wellbores where other artificial lift methods are difficult to implement.

In one example, two groups of magnets are interdigitated and have opposing faces. Reversing the polarity of one of the groups of magnets causes reciprocation of the movable magnet(s) and provides linear output to the noted production device. In another example, the groups of magnets are aligned adjacent each other and the movable magnet(s) is/are movable axially between a first position proximate the outer end of one of the stationary magnets and a second position proximate the outer end of another of the stationary magnets. Reversing the polarity of one of the groups of magnets causes reciprocation of the movable magnet(s) and provides the linear output to the production device. The magnets can be, for example, disc-shaped or rod-shaped.

In broader terms, one example of the electric motor includes a housing containing a series of magnets. The series includes at least three magnets, including two outer magnets and an inner magnet disposed between the two outer magnets. The two outer magnets have inside faces with like poles and outside faces with like poles. One of the inner magnet and the two outer magnets is stationary, while the other is movable. The one of the inner magnet and the two outer magnets that is movable moves between a first position in which the inner magnet is located proximate to one of the outer two magnets, and a second position in which the inner magnet is located proximate to the other of the two outer magnets. The one of the inner magnet and the two outer magnets that is movable is configured for connection to an operable production device. A supply of alternating current is coupled to the series of magnets so as to alternate the polarity of one of the inner magnet and the two outer magnets to thereby cause the one of the inner magnet and the two outer magnets that is movable to reciprocate between the first and second positions, and to thereby provide reciprocating linear output to drive the operable production device.

Another example of the electric motor includes a housing containing a plurality of aligned magnets. The plurality of magnets includes at least two adjacent, axially-aligned stationary magnets having outer ends having the same polarity and inner ends having the same polarity. The plurality of magnets also includes at least one movable magnet disposed adjacent to, or more specifically, within the stationary magnets. The movable magnet is movable axially between a first position proximate the outer end of one of the stationary magnets and a second position proximate the outer end of the other stationary magnet. The movable magnet is configured for connection to an operable production device in the well. A supply of alternating current is coupled to the plurality of magnets so as to alternate the polarity of one of the movable and stationary magnets to thereby cause the movable magnet to reciprocate between the first and second positions, and to thereby provide reciprocating linear output to drive the operable production device.

Downhole well pumping systems for artificial lift are also provided. The systems include a production pump disposed in a downhole well environment and an electric motor coupled to the production pump and operable to provide reciprocating linear output to drive the production pump. The configuration of the electric motor can be that of either of the two examples described above. A controller is configured to control operation of the electric motor by selectively supplying alternating current to the electric motor and to thereby provide reciprocating linear output to drive the operable production device.

BRIEF DESCRIPTION OF THE DRAWINGS

A best mode is described herein below with reference to the following drawing figures.

FIG. 8 depicts the example in FIG. 2 wherein the two inner magnets that are movable are connected to a spring.

DETAILED DESCRIPTION OF THE DRAWINGS

In the following description, certain terms have been used for brevity, clearness, and understanding. No unnecessary limitations are to be implied therefrom beyond the requirement of the prior art because such terms are used for descriptive purposes and are intended to be broadly construed. The different configurations described herein may be used alone or in combination with other configurations and systems. Various equivalents, alternatives, and modifications are possible within the scope of the appended claims.

Figure 1:
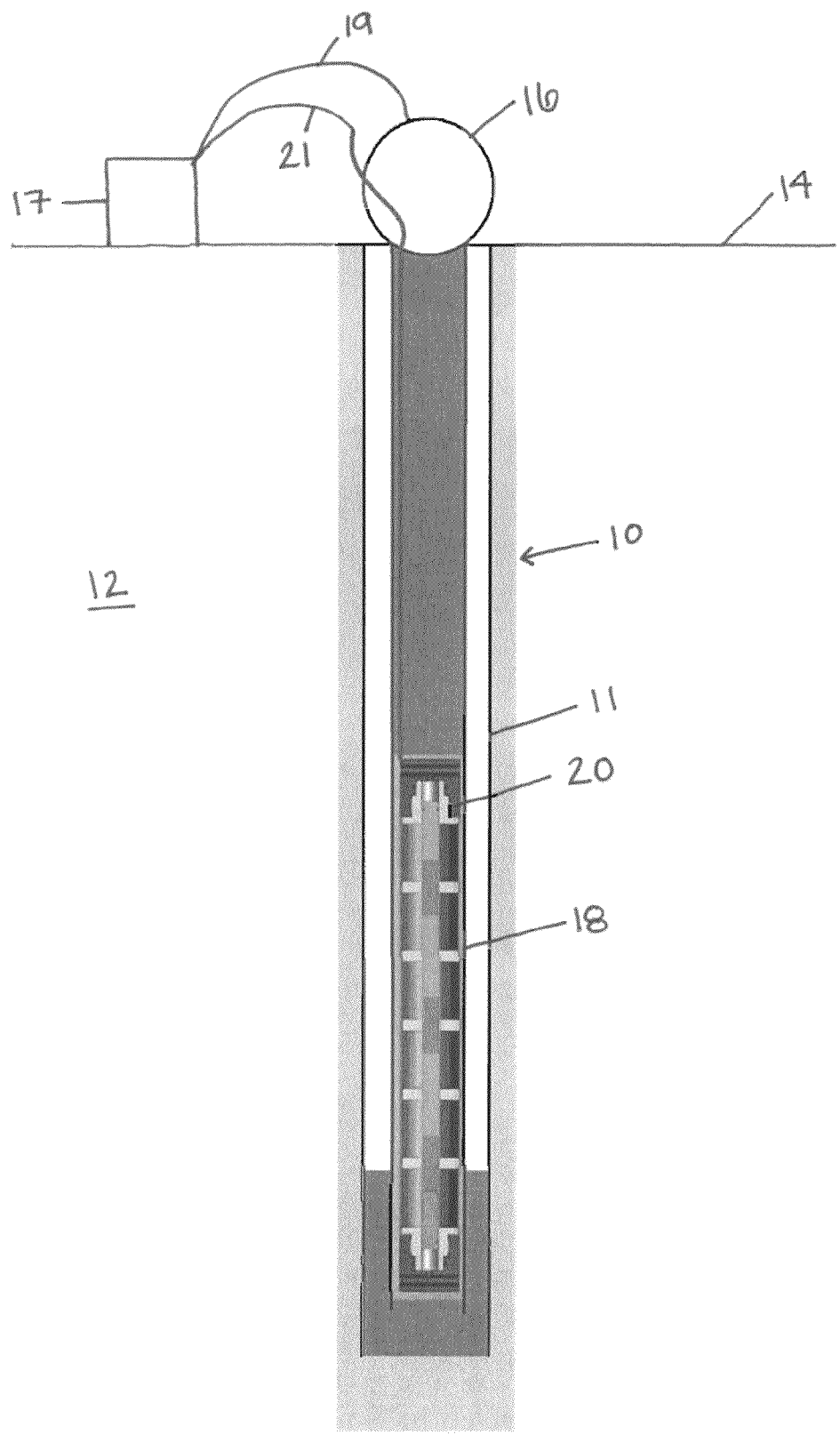
FIG. 1 depicts a downhole well pumping system according to one example of the present disclosure.

FIG. 1 depicts a well 11 that extends from a surface 14 into an underground or downhole well environment in a reservoir 12. The well 11 can be of any length and in the preferred example is a small-bore application. In the example shown, the well 11 has a vertical orientation; however, the well 11 can also or alternately extend at an angle or horizontal to the surface 14.

FIG. 1 also depicts an example of a system 10 according to the present disclosure. System 10 includes a controller 16, an electric motor 18, and related operable production device 20. The controller 16 preferably includes a memory and a programmable code which can be executed to control operation of the electric motor 18, such as for example to operate a source of power 17 to selectively supply alternating current to the electric motor 18 and to thereby provide a reciprocating linear output to the operable production device 20, as described further herein below. In the example shown, the controller 16 is located at the surface 14 and is communicatively attached to the source of power 17 and to the electric motor 18 via wired or wireless links 19, 21. This arrangement advantageously requires a minimal surface footprint. In other examples, the controller 16 could be attached directly to the motor 18 or to, for example, other related operating equipment. The electric motor 18 is coupled to the operable production device 20 and is configured to provide the noted reciprocating linear output to drive the operable production device 20. In the example shown, the operable production device 20 is a pump, such as a piston pump or a diaphragm or bag (bellows) pump; however it could comprise any other downhole mechanical device capable of receiving input from the motor 18.

Figure 2:
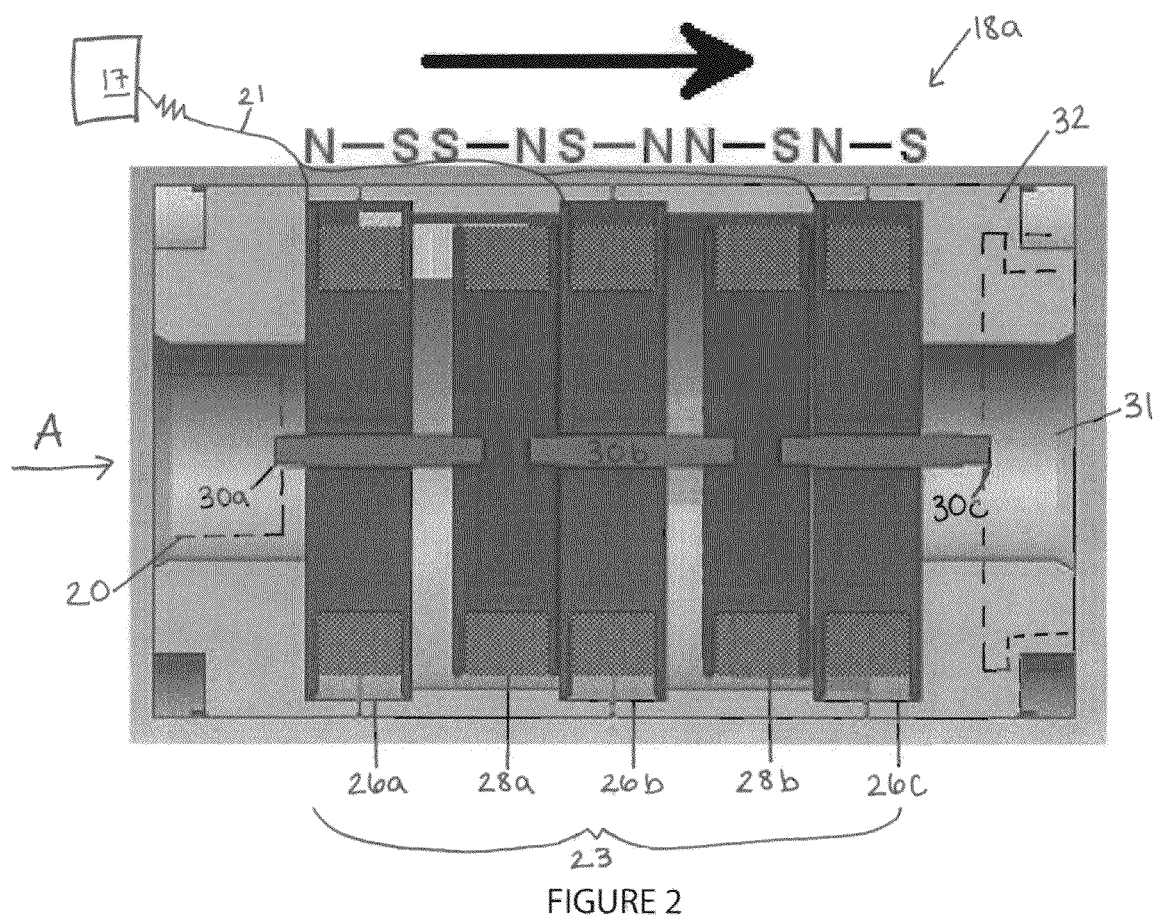
FIG. 2 depicts one example of an electric motor according to the present disclosure for deployment in a downhole well environment, wherein two inner magnets that are movable are positioned in a first position.

FIG. 2 depicts one example of the electric motor 18 according to the present disclosure. In this example, an electric motor 18a includes a housing 32 containing a series of magnets 23 aligned along an axial direction (A). The housing 32 serves as a mechanical support for the series of magnets 23 and as a path for magnetic flux, as will be described herein below. The series of magnets 23 includes a first group of magnets ("outer magnets") 26a, 26b, and 26c and a second group of magnets ("inner magnets") 28a, 28b disposed between the first group of magnets 26a-26c in an interdigitated configuration. The faces of the magnets 26a, 26b and 26c are aligned so as to have poles that are not all oriented the same in the axial direction. Rather, the poles at the opposing faces of the two magnets 26a, 26b are both south and the poles at the respective opposite faces of the magnets 26a, 26b are both north. In the same way, the poles at the opposing faces of the two magnets 26b, 26c are both north and the poles at the respective opposite faces of the magnets 26b, 26c are both south. The faces of the magnets 28a, 28b are also aligned so as to have poles that are not oriented the same in the axial direction. The poles at the opposing faces of the magnets 28a, 28b are both north, while the poles at the opposite faces of the magnets 28a, 28b are both south. The magnet 28a is aligned such that it is attracted to one of the opposing faces of the two magnets 26a, 26b and repelled from the other. The magnet 28b is aligned such that it is attracted to one of the opposing faces of the two magnets 26b, 26c and repelled from the other. Preferably the magnets 26a-26c and 28a, 28b are electromagnets; however, other types of magnets may be employed.

In the example shown, the magnets 26a-26c are stationary magnets, while the magnets 28a, 28b are movable magnets. The outer magnets 26a-26c are fixed in relation to the housing 32 and thus remain stationary relative to the housing 32. In contrast, the inner magnets 28a, 28b are movable in the axial direction (A) and movable relative to the outer magnets 26a-26c between first and second positions shown in FIGS. 2 and 3, respectively. It is only necessary that one of the groups of magnets 28a, 28b or 26a-26c remain stationary, while the other is movable between the first and second positions shown in FIGS. 2 and 3, respectively. In other words, the outer magnets 26a-26c could be movable, whereas the inner magnets 28a, 28b could remain stationary. It is also possible to construct the motor 18a with fewer or more magnets in each group. For example, the housing 32 could contain a series of magnets including only two outer magnets (e.g. 26a, 26b) and an inner magnet (e.g. 28a) disposed between the two outer magnets, wherein the two outer magnets have opposing faces with like poles and opposite faces with like poles. In this example, either of the two groups of magnets could be movable and connected to the device 20, with the other remaining stationary.

In the example shown, the movable magnet 28a is connected to the movable magnet 28b by a connector shaft 30b. Another connector shaft 30a connects the movable magnet 28a and the movable magnet 28b to the operable production device 20 (schematically shown in dashed lines) in such a manner that movement of the magnets 28a, 28b is conveyed to the operable production device 20. Another connector shaft 30c is also provided and is optionally removably connected to another series of magnets 31 (schematically shown in dashed lines) to increase or decrease productive output of the motor 18. In this unique modular design, the amount of linear output provided to the device 20 can be easily increased by adding additional series of magnets 31 to the motor 18a in a stacked formation and easily decreased by subtracting additional series of magnets 31 from the formation. The three connector shafts 30a-30c are separate, but could alternately be replaced with a single connector shaft extending through and/or around the various magnets in the series 23.

FIG. 8 depicts the electric motor 18a, wherein a spring 34 has been introduced into the series 23. The movable magnets 28a, 28b are connected to the spring 34 by the connector shaft 30c. The spring 34 is aligned such that it shortens and lengthens in the axial direction (A). One end of the spring 34 is connected to the connector shaft 30c, while the other end of the spring 34 is connected to the housing 32. The housing 32 has an aperture 33 which allows the connector shaft 30c to move through the housing 32. The spring can be used to increase the usable linear output of the motor 18a by smoothing the quadratic response created as the movable magnets move towards or away from the stationary magnets. The spring can also be used to pre-load the series of magnets 23 to increase the linear output in one direction, while decreasing it in the other direction.

Figure 3:
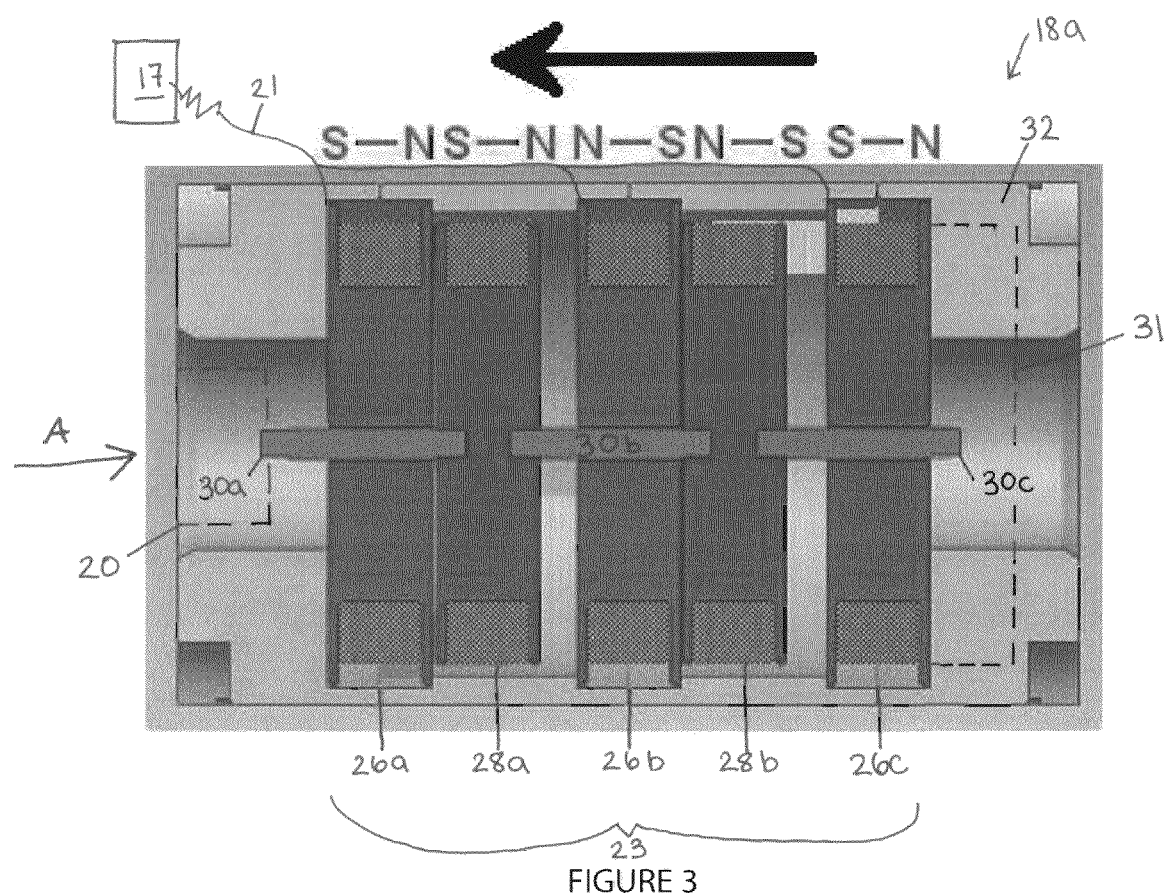
FIG. 3 depicts the example shown in FIG. 2, wherein the inner magnets are positioned in a second position.

In the example shown, the source of power 17 is connected to the stationary outer magnets 26a-26c by a wired link 21, preferably wired through the housing 32, to provide a supply of alternating current to the magnets 26a-26c and to thereby cause the poles of the magnets 26a-26c to alternate between the orientation in which the opposing faces of 26a, 26b have like south poles and the opposing faces of 26b, 26c have like north poles (shown in FIG. 2), and the orientation in which the opposing faces of 26a, 26b have like north poles and the opposing faces of 26b, 26c have like south poles (shown in FIG. 3). Alternating the polarity of the magnets 26a, 26b causes the magnet 28a to reciprocate back and forth between the noted first and second positions shown in FIGS. 2 and 3 respectively, while alternating the polarity of the magnets 26b, 26c causes the magnet 28b to reciprocate back and forth between the noted first and second positions. More specifically, FIG. 2 depicts the magnet 28a moved into a first position wherein the magnet 28a has a south-north pole orientation in the axial direction (A). The north pole of the magnet 28a is attracted to the south pole of the magnet 26b. When the current is alternated and the pole orientation of the magnets 26a, 26b is switched so that the opposing faces are both north poles, the north pole of the magnet 28a repels from the north pole of the magnet 26b, while the south pole of the magnet 28a attracts to the north pole of the magnet 26a. Thus, the magnet 28a moves from the first position shown in FIG. 2 to the second position shown in FIG. 3. When the current is alternated once again and the opposing faces of the magnets 26a, 26b are again south poles, the magnet 28a will again move to the first position shown in FIG. 2, where its north pole will be attracted to the south pole of the magnet 26b, while its south pole will be repelled from the south pole of the magnet 26a. The same repulsion and attraction occurs between magnets 26b, 26c, and 28b. In FIG. 2, the south pole of the magnet 28b is attracted to the north pole of the magnet 26c. When the current is alternated and the pole orientation of the magnets 26b, 26c is switched so that the opposing faces are both south poles, the south pole of the magnet 28b repels from the south pole of the magnet 26c, while the north pole of the magnet 28b attracts to the south pole of the magnet 26b. Thus, the magnet 28b moves from the first position shown in FIG. 2 to the second position shown in FIG. 3. When the current is alternated once again and the opposing faces of the outer magnets 26b, 26c are again north poles, the magnet 28b will again move to the first position shown in FIG. 2, where its south pole will be attracted to the north pole of the magnet 26c, while its north pole will be repelled from the north pole of the magnet 26b.

Providing alternating current to alternate the polarity of the outer magnets 26a-26c thereby causes the inner magnets 28a, 28b to reciprocate back and forth between the noted first position (FIG. 1) and the noted second position (FIG. 2) and in turn to provide linear output to the production device 20.

In another example, the source of power 17 could be connected to the movable magnets 28a, 28b to alternate their polarity but not the polarity of the stationary magnets 26a-26c, and to thereby cause the same reciprocation of the magnets 28a, 28b described above. It is to be understood that the three magnets 26a-26c could be movable, while the magnets 28a, 28b could be stationary. The polarity of either the magnets 28a, 28b or the magnets 26a-26c could be alternated in this configuration as well to provide reciprocating linear output to the operable production device 20.

It is also to be understood that the configuration in FIGS. 2 and 3 is shown as an example only, and that the same reciprocating linear motion could be created by any combination of at least three magnets: two outer magnets and one inner magnet disposed between the outer magnets, one of the inner magnet and the two outer magnets being stationary and the other being movable between the first and second positions. This disclosure therefore also contemplates combinations of four magnets, five magnets, six magnets, and so on.

Figure 4:
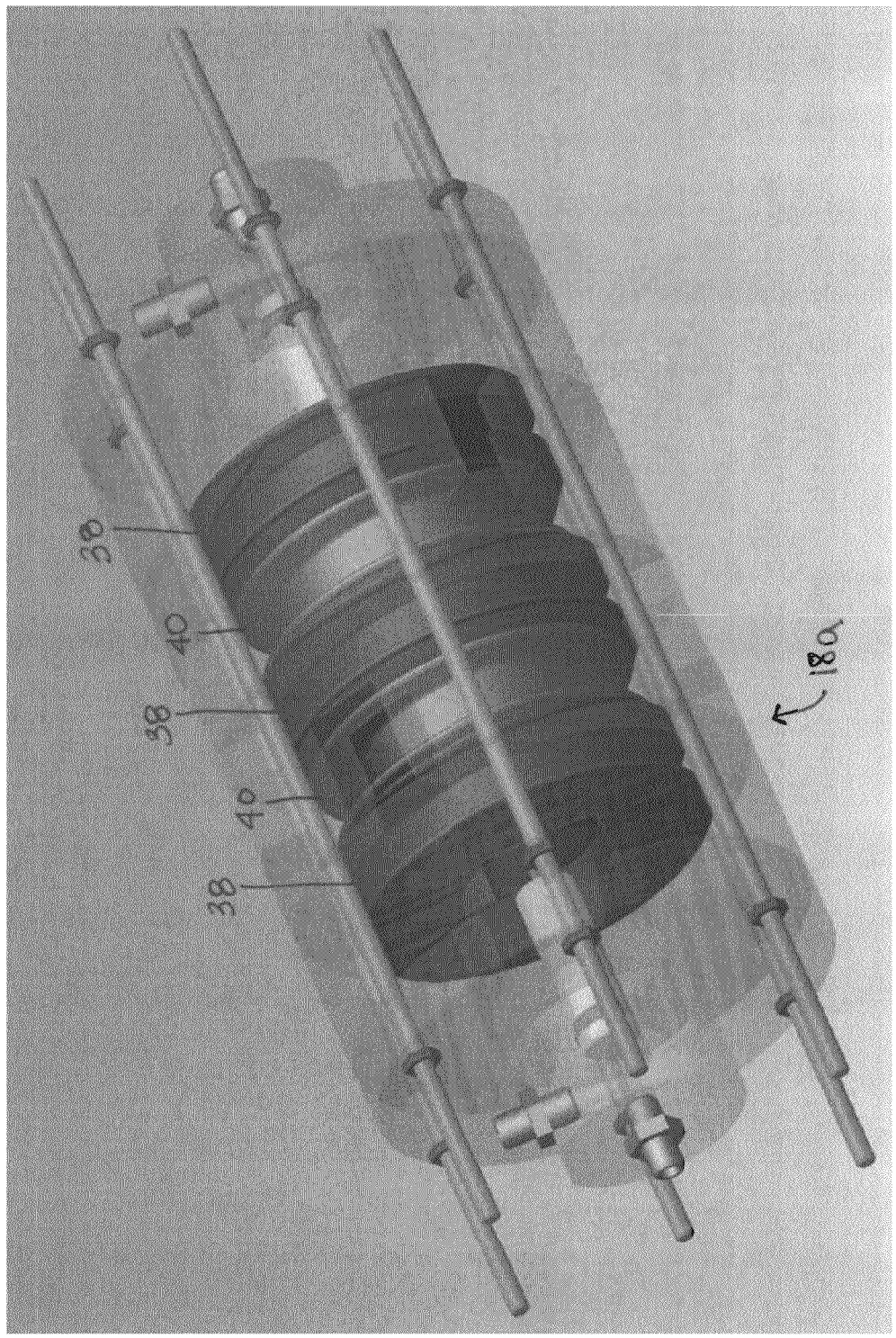
FIG. 4 depicts another example of an electric motor according to the present disclosure, wherein a series of magnets are disc-shaped.
Figure 5:
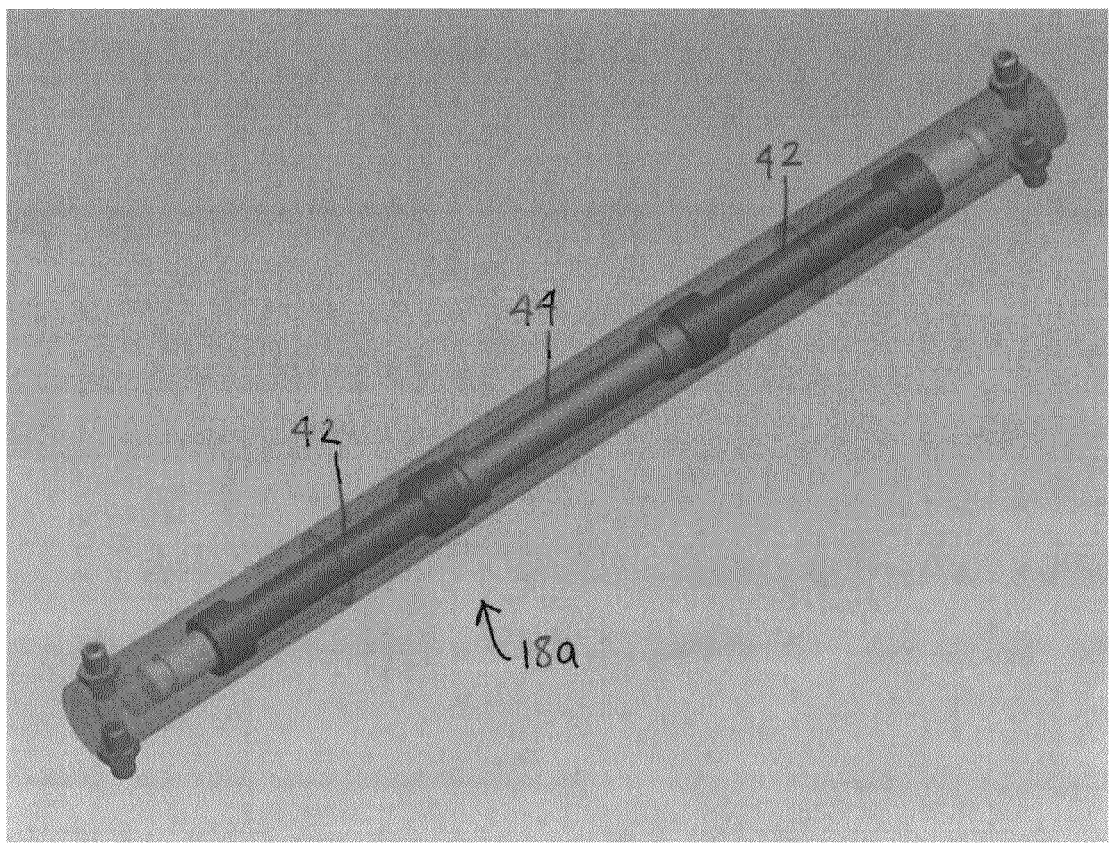
FIG. 5 depicts another example of an electric motor according to the present disclosure, wherein a series of magnets are rod-shaped.

The electric motor 18a may have various geometries, examples of which are shown in FIGS. 4 and 5. FIG. 4 shows a variation of the electric motor 18a, which uses disc-shaped outer magnets 38 and disc shaped inner magnets 40. FIG. 5 shows another variation of the electric motor 18a, which uses rod-shaped outer magnets 42 and rod-shaped inner magnets 44. Both the disc-shaped magnets 40 and the rod-shaped magnets 44 are capable of moving between the first and second positions as shown in FIGS. 2 and 3, respectively. The geometry of the magnets can be varied as shown in FIGS. 4 and 5 for different applications. For example, the rod-shaped magnets 42, 44 are particularly useful in small-bore applications due to their small diameter.

Figure 6:
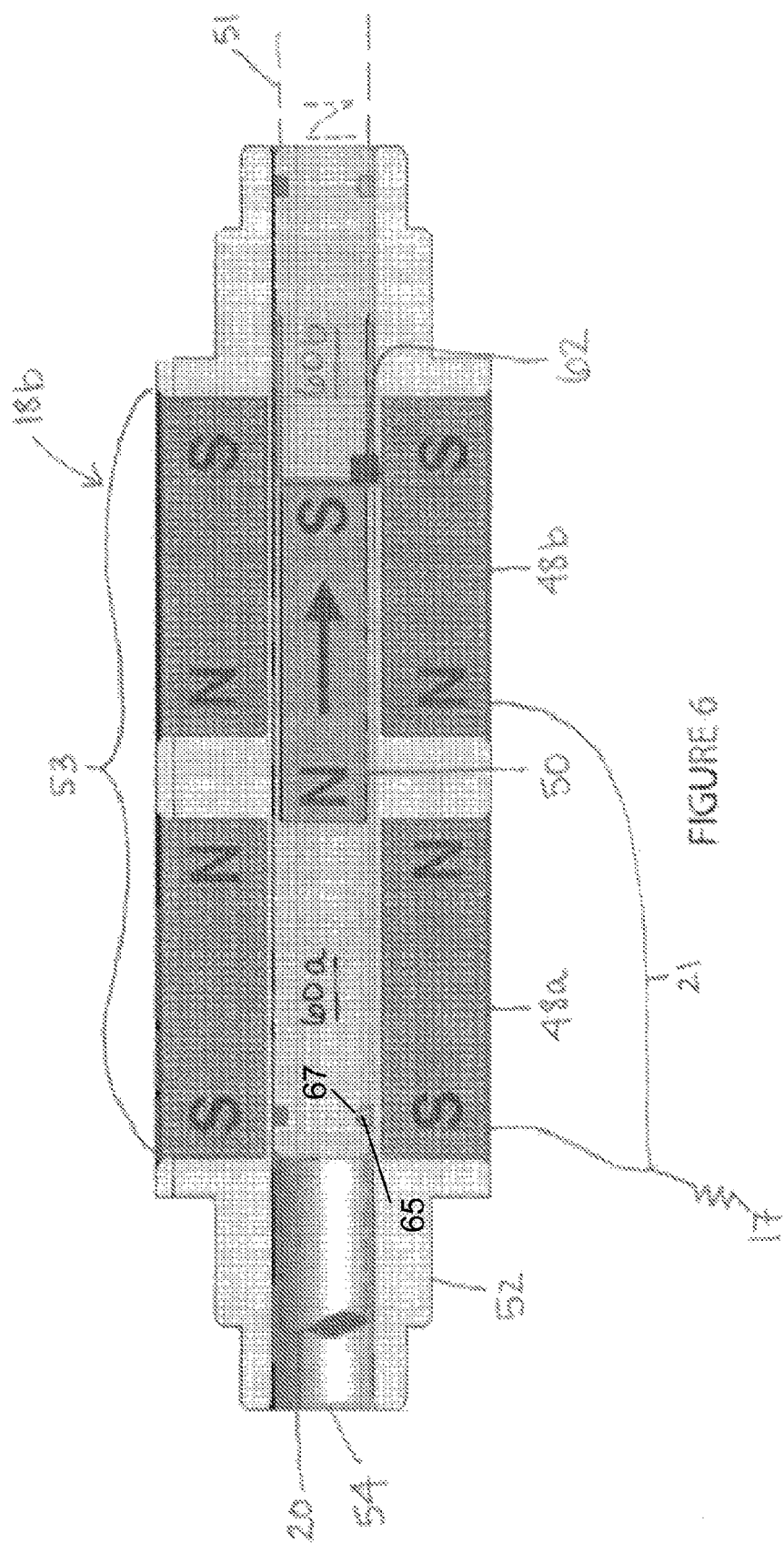
FIG. 6 depicts another example of an electric motor according to the present disclosure, wherein a movable magnet is moved into a first position proximate an outer end of one of two adjacent, axially-aligned stationary magnets.

FIG. 6 depicts another example of the electric motor 18 according to the present disclosure. Specifically, an electric motor 18b includes a housing 52 containing a plurality of aligned magnets 53 which includes at least two adjacent, stationary magnets 48 and at least one movable magnet 50 disposed adjacent to the stationary magnets 48a, 48b. The stationary magnets 48a, 48b are coupled to the housing 52 and are coils having outer ends with the same polarity and inner ends with the same polarity; in the example shown in FIG. 6, the outer ends of stationary magnets 48a, 48b are south poles, while the inner ends of stationary magnets 48a, 48b are north poles. The movable magnet 50 is disposed adjacent to the stationary magnets 48a, 48b. In the example shown, the movable magnet 50 is disposed in a through-going aperture 54, defined by the stationary magnets 48a, 48b. The movable magnet 50 is connected to a connector shaft 60a, 60b on either end. Connector shaft 60a connects the movable magnet 50 to the operable production device 20 in such a manner that movement of the movable magnet 50 is conveyed to the operable production device 20 (schematically shown in dashed lines). The other connector shaft 60b is optionally removably connected to another movable magnet 51 (schematically shown in dashed lines) to increase or decrease reciprocating linear output of the motor 18b. In this unique modular design, the amount of linear output provided to the device 20 can be easily increased by adding additional pluralities of aligned magnets 53 to the motor 18b in an axially stacked formation and also can be easily decreased by subtracting pluralities of magnets 53 from the formation. The two connector shafts 60a, 60b are separate, but could alternately be replaced with a single shaft extending through and/or around the movable magnet 50. Preferably the movable magnet 50 is a permanent magnet, while the stationary magnets 48a, 48b are electromagnets; however, other combinations of permanent and electromagnets may be employed.

The movable magnet 50 and connector shafts 60a, 60b are configured such that they substantially block any fluid from flowing through the through-going aperture 54 (see, e.g., an annular component 65 in an annular seat 67 of FIG. 6). This provides an advantage over the prior art, in which fluid can come into direct contact with the magnets in the housing and the magnets connected to the shaft. Fluids pumped from wells often contain small metallic pieces that stick to permanent magnets in the motor, and eventually clog the motor. By preventing fluid from flowing through the through-going aperture 54, this will not occur.

Figure 7:
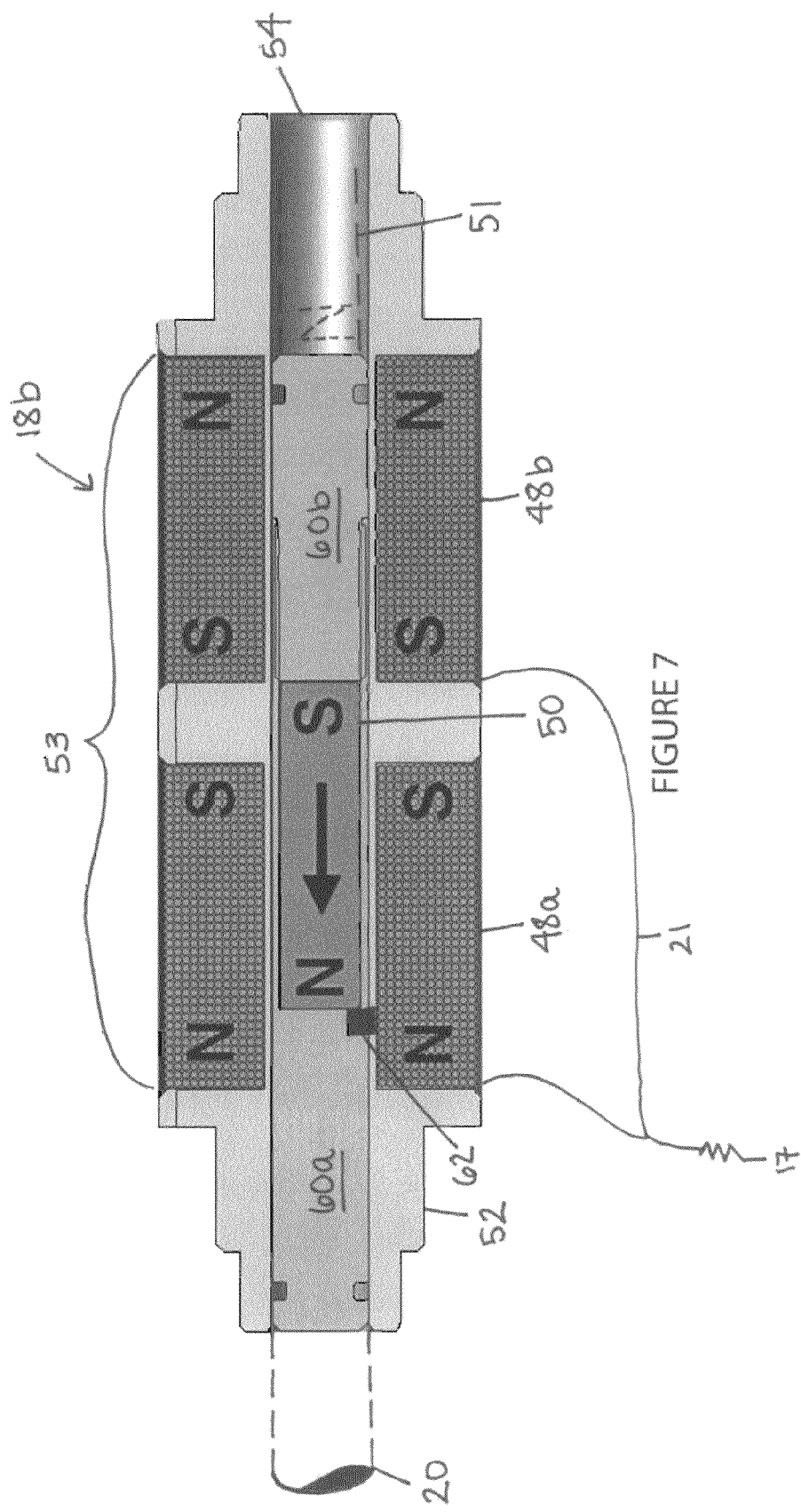
FIG. 7 depicts the example in FIG. 6 wherein the movable magnet is positioned in a second position proximate the outer end of the other of the two adjacent, axially-aligned stationary magnets.

In the example shown, the source of power 17 is connected to the stationary magnets 48a, 48b by a wired link 21 to provide a supply of alternating current to the magnets 48a, 48b and to thereby cause the poles of the magnets 48a, 48b to alternate between the orientation in which the inner ends of the stationary magnets 48a, 48b are north poles (shown in FIG. 6) and the orientation in which the inner ends of the stationary magnets 48a, 48b are south poles (shown in FIG. 7). Alternating the north-south orientation of the magnets 48a, 48b causes the movable magnet 50 to reciprocate back and forth between the noted first and second positions shown in FIGS. 6 and 7, respectively. Specifically, FIG. 6 depicts the movable magnet 50 in a first position wherein the movable magnet 50 has a north-south pole orientation. The south pole of the movable magnet 50 is attracted toward the south pole of the stationary magnet 48b such that, if it were allowed to continue moving, the south poles of the movable magnet 50 and the stationary magnet 48b would be aligned, and the net magnetic force on either magnet 50 or 48b would be zero. However, a physical stop 62 or a position sensor (not shown) prevents the movable magnet 50 from completely aligning its poles with those of the stationary magnet 48b. When the current is alternated and the pole orientation of the stationary magnets 48a, 48b is changed such that the inner ends of the stationary magnets 48a, 48b are both south poles (shown in FIG. 7), the movable magnet 50 attempts to align its north and south poles with the north and south poles of the stationary magnet 48a so as to cancel out the net force on either magnet 50 or 48a. Once again however, this is prevented by a physical stop 62 or a position sensor (not shown). When the current is again alternated to create the pole orientation shown in FIG. 6, the movable magnet 50 again attempts to align with the stationary magnet 48b. Thus the movable magnet 50 reciprocates back and forth between the noted first position (FIG. 6) and the noted second position (FIG. 7).

In another example, the source of power 17 is connected to the movable magnet 50 by a wired link 21 to alternate the polarity of the movable magnet 50 and thereby cause the same reciprocation of the movable magnet 50 as described above. However, this is not preferable because providing power to the movable magnet 50 would require that the wired link 21 reciprocate along with the movable magnet 50. Over time, this causes the wired link 21 to wear out, necessitating repair of the electric motor 18. Therefore, it is preferable that the movable magnet 50 be a permanent magnet, which does not require a wired link 21 to supply it with power.

What is claimed is:

1. An electric motor configured for deployment in a downhole well environment, the electric motor comprising:
    a housing containing a plurality of magnets, the plurality of magnets including at least two adjacent, axially-aligned stationary magnets;
    at least one movable magnet having a pump-side end, the at least one movable magnet being disposed adjacent to the stationary magnets and being movable axially between a first position proximate the outer end of one of the stationary magnets and a second position proximate the outer end of the other stationary magnet;
    a connector shaft connected to the at least one movable magnet for movement therewith wherein the connector shaft comprises a pump end for connection to a pump to pump well fluid and an annular component disposed between the pump end of the connector shaft and the pump-side end of the at least one movable magnet; and
    a supply of alternating current coupled to at least one of the magnets so as to alternate polarity to thereby cause the movable magnet to reciprocate between the first and second positions, and to thereby provide reciprocating linear output to drive the pump,
    wherein the at least one movable magnet is disposed in a through-going aperture defined by the housing, wherein the movable and stationary magnets are coaxially aligned, and wherein the annular component of the connector shaft substantially blocks well fluid pumped by the pump from flowing through the through-going aperture of the housing and contacting the at least one movable magnet.

2. The electric motor according to claim 1, comprising a second plurality of coaxially aligned magnets coupled to the other side of the movable magnet, the second plurality of coaxially aligned magnets comprising:
    at least two adjacent, axially-aligned stationary magnets defining a through-going aperture, and at least one movable magnet disposed in the through-going aperture, the movable magnet being movable axially between a first position proximate the outer end of one of the stationary magnets and a second position proximate the outer end of the other stationary magnet,
    wherein the reciprocations of the movable magnet in the second plurality of coaxially aligned magnets adds to the reciprocating linear output of the first plurality of coaxially aligned magnets.

3. The electric motor according to claim 1, wherein the movable magnet is a permanent magnet.

4. The electric motor according to claim 3, wherein the stationary magnets are electromagnets and wherein the supply of alternating current is connected to the stationary magnets.

5. A downhole well pumping system for artificial lift comprising:
    a production pump disposed in a downhole well environment to pump well fluid;
    an electric motor coupled to the production pump and operable to provide reciprocating linear output to drive the production pump;
    wherein the electric motor comprises a housing containing a plurality of coaxially aligned magnets, the plurality of coaxially aligned magnets including at least two adjacent, stationary magnets defining a through-going aperture, and at least one movable magnet having a pump-side end, the at least one movable magnet being disposed in the through-going aperture and being movable axially between a first position proximate the outer end of one of the stationary magnets and a second position proximate the outer end of the other stationary magnet;
    a connector shaft connected to the at least one movable magnet for movement therewith wherein the connector shaft comprises a pump end for connection to the production pump and an annular component disposed between the pump end of the connector shaft and the pump-side end of the at least one movable magnet to substantially block well fluid pumped by the production pump from flowing through the through-going aperture and contacting the at least one movable magnet; and
    a controller configured to control operation of the electric motor by selectively supplying alternating current to the electric motor so as to alternate polarity of at least one of the magnets to thereby cause the movable magnet to reciprocate between the first and second positions, and to thereby provide reciprocating linear output to drive the production pump.

6. The downhole well pumping system of claim 5 wherein the production pump comprises a piston pump.

7. The downhole well pumping system of claim 5 wherein the stationary magnets comprises electromagnets and wherein the at least one movable magnet comprises a permanent magnet.

8. The downhole well pumping system of claim 5 wherein the operable production device comprises a piston pump.

9. A downhole well pumping system comprising:
- a housing defining an axis and a through-going aperture along the axis, the housing having an axial length;
- an electromagnet disposed in the housing about the through-going aperture, the electromagnet having an axial length less than the axial length of the housing;
- a wire link to supply alternating current to the electromagnet;
- a permanent magnet disposed in the through-going aperture and reciprocally movable along the axis responsive to supply of alternating current to the electromagnet wherein the permanent magnet comprises a pump-side end;
- a pump for pumping well fluid;
- a connector shaft that comprises a pump end, the connector shaft being operatively connected to the permanent magnet for driving the pump; and
- an annular component disposed on and about the connector shaft between the pump end of the connector shaft and the pump-side end of the permanent magnet to substantially block fluid pumped by the pump from flowing through the through-going aperture about the connector shaft and to the permanent magnet.

10. The downhole pumping system of claim 9 wherein the connector shaft comprises an annular seat for seating the annular component.

11. The downhole pumping system of claim 9 wherein the connector shaft extends through the permanent magnet.

* * * * *